United States Patent
Whurr et al.

(10) Patent No.: US 10,472,978 B2
(45) Date of Patent: Nov. 12, 2019

(54) FAN BLADE APPARATUS

(71) Applicant: ROLLS-ROYCE plc, London (GB)

(72) Inventors: John Whurr, Derby (GB); Martyn Richards, Burton on Trent (GB)

(73) Assignee: ROLLS-ROYCE plc, London (GB)

( * ) Notice: Subject to any disclaimer, the term of this patent is extended or adjusted under 35 U.S.C. 154(b) by 462 days.

(21) Appl. No.: 15/346,334

(22) Filed: Nov. 8, 2016

(65) Prior Publication Data

US 2017/0159462 A1  Jun. 8, 2017

(30) Foreign Application Priority Data

Dec. 7, 2015  (GB) .................................... 1521516.3

(51) Int. Cl.
| | | |
|---|---|---|
| F01D 7/00 | (2006.01) | |
| F02K 3/06 | (2006.01) | |
| F04D 29/38 | (2006.01) | |

(52) U.S. Cl.
CPC .................. F01D 7/00 (2013.01); F02K 3/06 (2013.01); F04D 29/388 (2013.01); F05D 2220/36 (2013.01); F05D 2240/30 (2013.01); F05D 2260/70 (2013.01)

(58) Field of Classification Search
CPC ... F01D 5/146; F01D 7/00; F02K 3/06; B64C 11/32; F04D 29/323; F04D 29/388; F05D 2220/36; F05D 2240/30; F05D 2260/70
See application file for complete search history.

(56) References Cited

U.S. PATENT DOCUMENTS

| | | | |
|---|---|---|---|
| 3,467,198 A * | 9/1969 | Ellinger | .................... F01D 7/00 416/157 R |
| 3,468,473 A | 9/1969 | Davies | |
| 3,472,321 A | 10/1969 | Ringer | |

(Continued)

FOREIGN PATENT DOCUMENTS

| | | |
|---|---|---|
| EP | 2535519 A2 | 12/2012 |
| FR | 2046296 A5 | 3/1971 |

(Continued)

OTHER PUBLICATIONS

Machine Translation of FR2046296; Retrieved from Espacenet on Mar. 30, 2019. (Year: 2019).*

(Continued)

*Primary Examiner* — Jason D Shanske
*Assistant Examiner* — Sang K Kim
(74) *Attorney, Agent, or Firm* — Oliff PLC

(57) ABSTRACT

A gas turbine engine fan blade apparatus is disclosed comprising a reverse pitch rotatable mounting and an aerofoil part. The aerofoil part comprises radially inner and radially outer portions that are separated by an interface extending from a leading edge of the aerofoil part to a trailing edge of the aerofoil part. The reverse pitch rotatable mounting locates the radially inner and radially outer portions with respect to one another. The reverse pitch rotatable mounting and separation at the interface permit relative pitch change rotation between the radially inner and radially outer portions such that one of the radially inner and radially outer portions is rotatable to a reverse pitch configuration by comparison with the other portion.

10 Claims, 3 Drawing Sheets

(56) References Cited

U.S. PATENT DOCUMENTS

| | | | |
|---|---|---|---|
| 3,549,272 A * | 12/1970 | Bouiller | F01D 5/022 |
| | | | 415/130 |
| 4,968,217 A | 11/1990 | Newton | |
| 5,281,087 A | 1/1994 | Hines | |
| 8,161,728 B2 * | 4/2012 | Kupratis | F02K 3/077 |
| | | | 415/124.1 |
| 2010/0260591 A1 | 10/2010 | Martin et al. | |

FOREIGN PATENT DOCUMENTS

| | | |
|---|---|---|
| GB | 1 190 365 A | 5/1970 |
| GB | 1 316 307 A | 5/1973 |
| WO | 2015/088833 A1 | 6/2015 |

OTHER PUBLICATIONS

Jun. 9, 2016 Search Report issued in British Patent Application No. 1521516.3.

Mar. 30, 2017 Search Report issued in European Patent Application No. 16197708.

\* cited by examiner

FAN BLADE APPARATUS

The present disclosure concerns a fan blade apparatus. More specifically the disclosure concerns fan blade apparatus', gas turbine engines and methods of operating a gas turbine engine.

Most traditional gas turbine engine thrust reverse systems are provided by a combination of deployable blocker doors and translatable portions of cowling. Together these inhibit the flow of air through the gas turbine engine in the conventional direction and divert it to be exhausted in a direction conducive to reverse thrust. Such systems are effective but add considerable weight and complexity to the design of an engine.

A variable pitch fan is a gas turbine engine fan having blades which are rotatable in order that the pitch of the blades can be altered. The option to selectively alter fan blade pitch between finer and coarser settings may be advantageous in managing thrust produced by the fan and airflow through the engine. The pitch of the fan blades may therefore be tailored to better match the operating regime of the engine at any given time. This may improve efficiency of the engine and stability of its various compressive components.

Variable pitch fans can also be used to provide reverse thrust by altering the pitch of the blades sufficiently to reverse the thrust direction produced given consistent rotation direction of the fan as a whole. A variable pitch fan capable of thrust reverse may allow omission of the heavy and complex additional thrust reverse equipment previously described. Nonetheless thrust reverse functionality using a variable pitch fan raises the fundamental difficulty that the reversal of flow through the fan tends to starve the core of the engine of air via the conventional route. To overcome this problem the core is typically supplied with air via a bypass duct of the engine. Some of the air entering through an exhaust of the bypass duct and travelling towards the fan turns through approximately 180 degrees behind the fan and around a core cowling before entering a core inlet. Whilst the core can be supplied with air in this way, the suction effect of the fan operating in a reverse thrust mode tends to reduce and disturb the airflow to the core. It can therefore be necessary to provide a variable bypass nozzle (so as its angle can be adjusted to be better suited to use as an intake) and/or a variable core inlet geometry (to assist in turning air into the core during reverse thrust operation). The provision of such equipment tends however to nullify the advantage of omitting separate thrust reverser technology by reintroducing complex and heavy components specifically to facilitate variable pitch fan thrust reversal functionality.

According to a first aspect there is provided a gas turbine engine fan blade apparatus comprising a reverse pitch rotatable mounting and an aerofoil part, the aerofoil part comprising radially inner and radially outer portions that are separated by an interface extending from a leading edge of the aerofoil part to a trailing edge of the aerofoil part and where further the reverse pitch rotatable mounting locates the radially inner and radially outer portions with respect to one another and the reverse pitch rotatable mounting and separation at the interface permit relative pitch change rotation between the radially inner and radially outer portions such that one of the radially inner and radially outer portions is rotatable to a reverse pitch configuration by comparison with the other portion.

It will be understood that where the phrase forward pitch is used throughout this specification it should be taken to include a feathered pitch in which the relevant portion has its chord substantially parallel to the air flow. Such a pitch may be advantageous in particular situations (e.g. where an engine has failed and it is desirable to minimise the drag caused by the engine).

As will be appreciated the fan blade apparatus may be used while the associated gas turbine engine is running, particularly during landing and/or deceleration of a vehicle (such as an aircraft) on which the engine may be installed. The split aerofoil part allows for one of the portions to provide reverse thrust via rotation into a reverse pitch configuration whilst the other portion remains in a forward pitch configuration. In this way an unfavourable impact on flow to a core of the gas turbine engine may be reduced in a reverse thrust mode by comparison with rotation of the whole of a conventional fan blade aerofoil part into a reverse pitch configuration. Specifically the use of the split aerofoil part may reduce or prevent reverse flow adjacent an inlet to the core and may therefore allow more air to travel less turbulently into the core from a bypass duct when the engine is operating in a reverse thrust mode. Additionally or alternatively it may be that the portion remaining in the forward configuration continues to drive air in a conventional direction from upstream to downstream of the fan and into the core.

In some embodiments the gas turbine engine fan blade apparatus further comprises a housing and a variable pitch rotatable mounting which locates the aerofoil part with respect to the housing and where further the variable pitch rotatable mounting permits pitch change of the other portion with respect to the housing. By permitting pitch change of both portions an additional degree of control may be obtained. Specifically the whole aerofoil part may be rotated to alter its pitch. This may assist with operational stability of the fan blade apparatus and/or wider systems as gas turbine engine operating conditions vary.

In some embodiments the housing comprises a fan disc or hub.

In some embodiments rotation of the other portion on the variable pitch rotatable mounting is limited to a range of forward pitch configurations. Prevention of rotation into a reverse pitch configuration for the other portion may be provided by a stop or a limitation in the travel of a pitch change mechanism.

In some embodiments the portion capable of adopting the reverse configuration is rotatable throughout the same range of forward pitch configurations as the radially inner portion. Such functionality may allow full variable forward pitch operation of the whole aerofoil part.

In some embodiments the radially inner and radially outer portions are relatively rotatable on the reverse pitch rotatable mounting to an aligned configuration whereby they have the same pitch. In this way the radially inner and radially outer portions may be aligned so as they can operate together to act as a conventional aerofoil part when reverse thrust is not required. When the radially inner and radially outer portions are in the aligned configuration the aerofoil part may have a substantially continuous fluid washed surface.

In some embodiments the radially inner and radially outer portions comprise cooperating stop surfaces that abut when the radially inner and radially outer portions are in the aligned configuration.

In some embodiments the stop surfaces prevent relative rotation of the radially inner and radially outer portions beyond the aligned configuration in a rotational direction corresponding to returning the portion capable of adopting the reverse pitch configuration to the aligned configuration from the reverse pitch configuration. The stop surfaces may therefore prevent over rotation of the radially outer portion beyond the aligned configuration from a finer to a courser pitch configuration.

In some embodiments the radially outer portion comprises an inner surface and the radially inner portion comprises an outer surface which opposes the inner surface at the interface when the radially inner and radially outer portions are in the aligned configuration, and each of the inner and outer surfaces comprise at least one radially extending lip and at least one radial rebate alternating around a perimeter of the respective surface and where further, when the radially inner and radially outer portions are in the aligned configuration, the radially extending lips of both the inner and outer surfaces are opposed by radial rebates of the other surface and the radial rebates of both the inner and outer surfaces are opposed by radially extending lips of the other surface. The radial rebates may be sized to accommodate the radially extending lips in a close fit such that with the radially inner and radially outer portions in the aligned configuration a surface, air washed in use, of the aerofoil part is substantially continuous over the interface.

In some embodiments the stop surfaces comprise end walls of the radially extending lips.

In some embodiments a spar connected to the radially outer portion extends radially inwards therefrom and through an internal passage in the radially inner portion.

In some embodiments a spindle connected to the radially inner portion extends radially inwards therefrom and the spar extends so that at least parts of the spar and spindle are concentric.

In some embodiments the reverse pitch rotatable mounting is located between the spar and spindle in an area where they are concentric. In alternative embodiments however the reverse pitch rotatable mounting is located at the interface or a pair of reverse pitch rotatable mountings. Alternatively one is located at each location.

In some embodiments the reverse pitch rotatable mounting comprises a bearing.

In some embodiments the housing further comprises a collar seated in an orifice of the fan disc or hub, at least part of the collar being concentric with at least part of the spindle and the variable pitch rotatable mounting being located between the spindle and the collar in an area where they are concentric.

In some embodiments the variable pitch rotatable mounting comprises a bearing.

In some embodiments the collar is at least partially retained in the orifice by a lock nut attached to the fan disc or hub.

In some embodiments the gas turbine engine fan blade apparatus further comprises a pitch change mechanism for altering the pitch of the radially outer portion on the reverse pitch rotatable mounting and/or for altering the pitch of the radially inner portion on the variable pitch rotatable mounting. The pitch change mechanism may comprise an actuator or actuators. The actuator or actuators may be connected to or may be part of a piston or pistons that are hydraulically or pneumatically driven. As will be appreciated however alternatives to the piston or pistons may be used (e.g. electrical or mechanical drive).

In some embodiments where the radially inner and radially outer portions are in the aligned configuration, pitch changes of the other portion are matched by the portion capable of adopting the reverse pitch configuration. To achieve this it may be that respective pitch change mechanisms for the radially inner and radially outer portions are operated in unison, unless and until reverse pitch of the portion capable of reverse pitch is required. Additionally or alternatively the portion capable of adopting the reverse pitch configuration may be carried by the other portion in at least one rotational direction where there is a pitch change of the other portion via rotation on the variable pitch rotatable mounting. Specifically it may be that the cooperating stops cause carrying of the portion capable of adopting the reverse pitch configuration by the other portion where the other portion is rotated in a direction from coarser to finer pitch. In such circumstances a pitch change mechanism for rotating the portion capable of adopting the reverse pitch configuration may be passive and/or bypassed. Furthermore the portion capable of adopting the reverse pitch configuration may, in use, follow the other portion under the influence of on-rushing air, thereby maintaining the aligned configuration where there is a pitch change of the other portion from finer to coarser pitch.

In some embodiments it is the radially outer portion that is rotatable on the reverse pitch rotatable mounting to the reverse pitch configuration. In this way, when the engine is operating in a reverse thrust mode, the reverse thrust producing portion may be better aligned with the bypass duct and the forward thrust producing portion may be better aligned with the core.

According to a second aspect there is provided a gas turbine engine comprising at least one fan blade apparatus in accordance with the first aspect.

In some embodiments the gas turbine engine comprises a bypass duct and a core duct separated by a core casing and the radial position of the interface between the radially inner and radially outer portions is substantially aligned with the radial position of a leading edge of the core duct. If the radial extents of the radially inner and radially outer portions are matched and aligned to the core and bypass duct inlets respectively then there may be improved reverse flow from the bypass duct via the radially outer portion and improved flow to the core from the bypass duct and/or via the radially inner portion.

In some embodiments the fan blade is axially spaced from the core casing such that a flow path is created behind the fan for the flow of air from the bypass duct to the core duct sufficient for thrust reverse operation. In this way air may be able to flow efficiently without significant impediment from the bypass duct to the core, in sufficient quantity to allow the core to continue running and powering thrust reverse operation.

According to a third aspect there is provided an aircraft comprising a gas turbine engine in accordance with the second aspect.

According to a fourth aspect there is provided a method of operating a gas turbine engine comprising a fan blade apparatus, the method comprising selectively rotating a radially outer portion of an aerofoil part of the apparatus with respect to a radially inner portion of the aerofoil part such that the radially outer portion has a reverse pitch configuration by comparison with the inner portion. With the engine running, such rotation may allow for reverse thrust to be provided by the radially outer portion without detrimentally affecting flow to a core of the engine to the extent that might otherwise arise.

In some embodiments the method further comprises selectively rotating the radially outer portion and/or the radially inner portion into an aligned configuration whereby they have the same forward pitch.

In some embodiments the method further comprises selectively rotating the radially inner and radially outer portions in unison to vary the angle of the forward pitch of the whole aerofoil part.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

Embodiments will now be described by way of example only, with reference to the Figures, in which.

Figure 1:
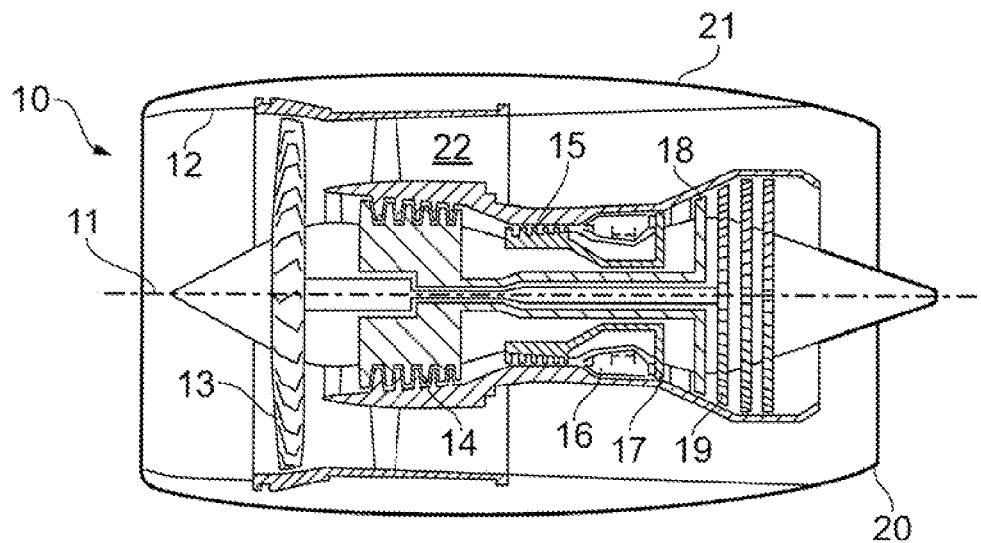
FIG. 1 is a sectional side view of a gas turbine engine.

With reference to FIG. 1, a gas turbine engine (in this case a turbofan) is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 2A:
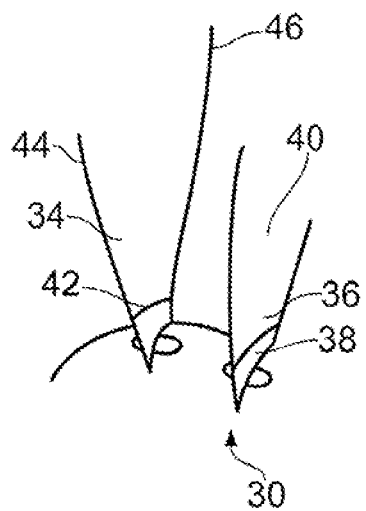
FIGS. 2a & 2b show perspective views of alternative configurations of a gas turbine engine fan apparatus according to an embodiment of the invention.
Figure 2B:
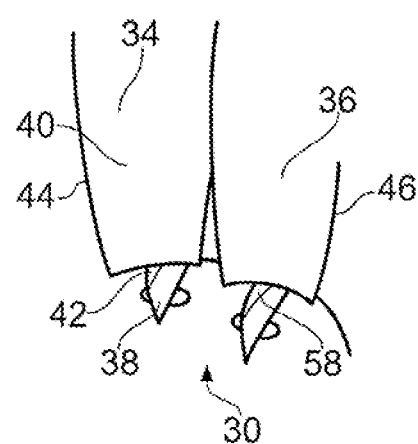
Figure 3:
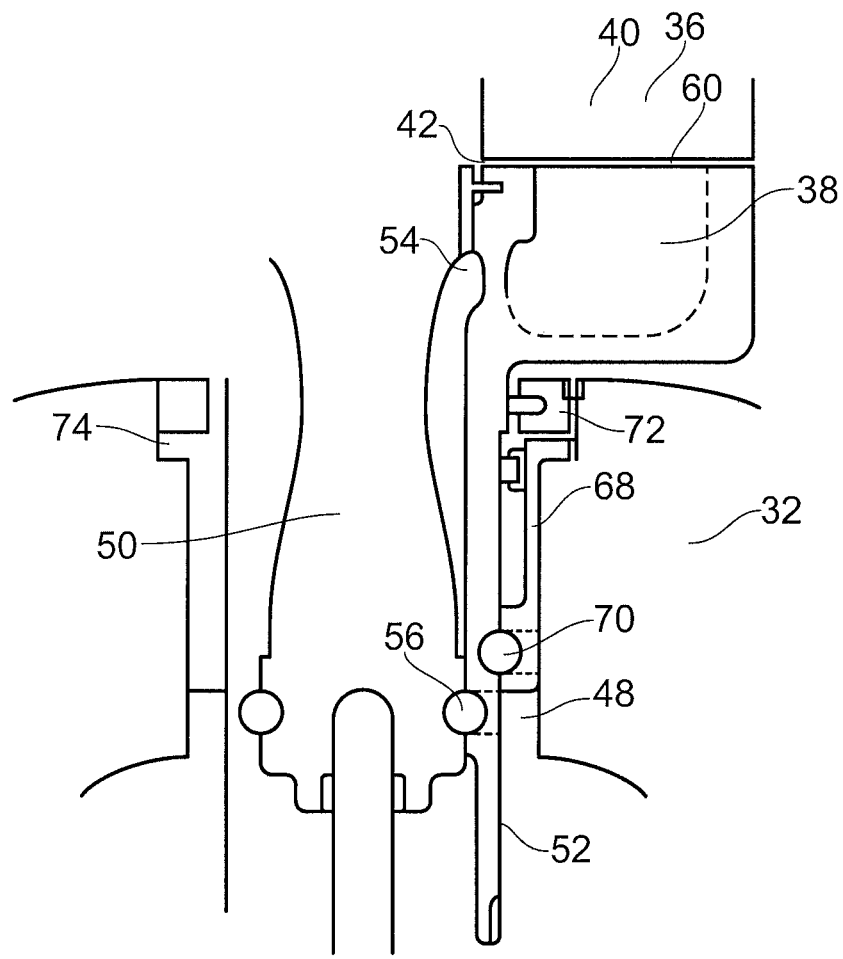
FIG. 3 is a cross-sectional view through a gas turbine engine fan blade apparatus in accordance with an embodiment of the invention.

Referring now to FIGS. 2a, 2b and 3 part of a gas turbine engine fan blade apparatus is generally shown at 30 and is suitable for use in engines such as the FIG. 1 engine discussed above in place of its conventional fan 13. The fan blade apparatus 30 comprises a housing (in this case partially formed by a fan disc 32) and a plurality of blades 34 secured in the fan disc 32. The fan blade apparatus 30 also has pitch change mechanism for the blades 34 discussed later with reference to FIGS. 5a and 5b.

Each blade 34 has an aerofoil part 36 that is air washed in use. Each aerofoil part 36 is provided in two parts, a radially inner portion 38 comprising the whole of the aerofoil part 36 out to a particular radius, and a radially outer portion 40 comprising the whole of the aerofoil part 36 beyond that radius. Both portions 38, 40 have an aerofoil form. The radially inner 38 and radially outer 40 portions are separated at an interface 42. The interface 42 extends in a substantially chordwise direction from a leading 44 to a trailing 46 edge of the aerofoil part 36. The radially inner 38 and radially outer 40 portions may be in contact at the interface 42 but are nonetheless separate components in that they can in principle be reoriented with respect to one another.

Extending from the aerofoil part 36 radially inwards and through an orifice 48 in the disc 32 are a spar 50 and a spindle 52. The spindle 52 comprises a hollow cylindrical projection extending from the radially inner portion 38. The cylindrical hollow defined by the spindle 52 is aligned with a similar radially extending cylindrical passage 54 passing through the radially inner portion 38. The spar 50 comprises a rod-like projection extending from the radially outer portion 40 and passing through the passage 54 and the hollow of the spindle 52, coaxial and concentric therewith. Between the spar 50 and spindle 52 is a first reverse pitch rotatable mounting, in this case a roller bearing 56. The roller bearing 56 is one means by which the radially inner 38 and radially outer portions 40 are located with respect to one another.

A second means by which the radially inner 38 and radially outer portions 40 are located with respect to one another is provided at the interface 42. The radially inner portion 38 has an outer surface 58 which is opposed (i.e. faces) by an inner surface 60 of the radially outer portion 40. Surrounding the spar 50 the radially outer 58 and radially inner 60 surfaces define cooperating bearing collars 61 (only one shown), which constitute a second reverse pitch rotatable mounting. The bearing collars 61 further locate the radially inner 38 and radially outer 40 portions with respect to one another.

Between them the separation at the interface 42 and the first and second reverse pitch rotatable mountings facilitate relative pitch change rotation between the radially inner 38 and radially outer 40 portions. Specifically the radially outer portion 40 can be rotated on the first and second reverse pitch rotatable mountings such that it is in a reverse pitch configuration by comparison with the radially inner portion 38 (see FIG. 2b). Furthermore the radially outer portion 40 can be rotated on the first and second reverse pitch rotatable mountings such that it is in an aligned configuration with the radially inner portion 38, that is that both portions 38, 40 have the same pitch (see FIG. 2a). When in the aligned configuration the radially inner 38 and radially outer 40 portions form a substantially continuous fluid washed surface.

Figure 4:
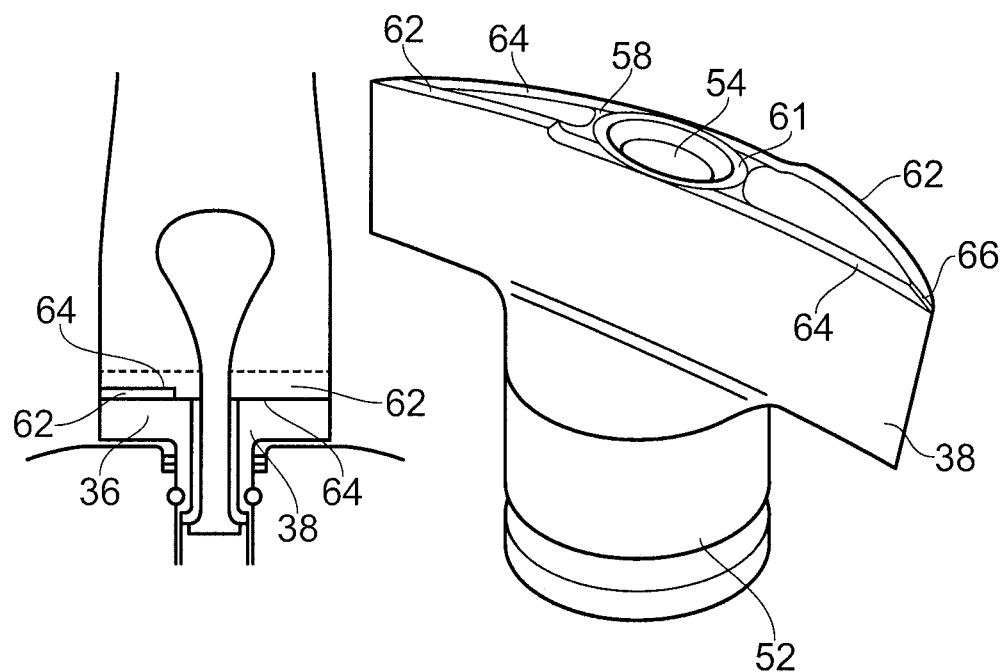
FIG. 4 shows perspective views of parts of a gas turbine engine fan blade apparatus in accordance with an embodiment of the invention.

Referring now to FIG. 4 an aspect of the interface 42 is described in more detail. Both the outer 58 and inner 60 surfaces have a pair of radially extending lips 62 and a pair of radial rebates 64 alternating between the two around a perimeter of the respective surface 58, 60. Each radially extending lip 62, be it on the outer 58 or inner 60 surface is opposed by a radial rebate 64 in a close fit when the radially inner 38 and radially outer 40 portions are in the aligned configuration. Similarly each radial rebate 64, be it on the outer 58 or inner 60 surface is opposed by a radially extending lip 62 in a close fit when the radially inner 38 and radially outer 40 portions are in the aligned configuration. End walls 66 of the radially extending lips 62 provide stop surfaces, whereby pairs of stop surfaces, (a pair comprising one stop surface from each of the outer 58 and inner 60 surfaces) abut when the radially inner 38 and radially outer 40 portions are in the aligned configuration. The cooperating stop surfaces prevent over rotation of the radially outer portion 40 beyond the aligned configuration in a rotational direction of the radially outer portion 40 from finer to a courser pitch.

Returning to FIG. 3 a further portion of the housing, a collar 68 comprising a sleeve like cylinder is positioned within the orifice 48 between the spindle 52 and the disc 32. Between the collar 68 and the spindle 52 is a variable pitch rotatable mounting (in this case a roller bearing 70) which locates the aerofoil part 36 with respect to the housing. A lock nut 72 is secured to the disc 32 and bears on a flange 74 of the collar 68 to secure the collar 68 in a radial direction. The variable pitch rotatable mounting permits pitch change of the radially inner portion 38 with respect to the housing. Therefore where the radially inner 38 and radially outer portions 40 are in the aligned configuration they are rotatable in unison through a range of forward pitch configurations for full aerofoil part 36 forward pitch variability.

Figure 5A:
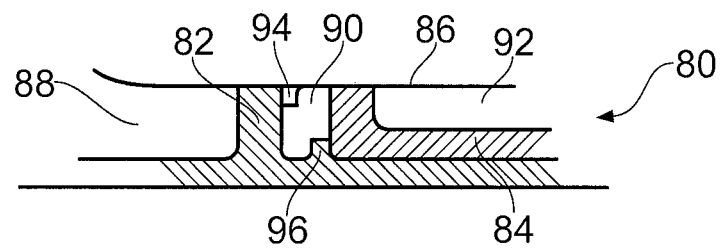
FIGS. 5a & 5b show cross-sectional views of a pitch change mechanism in accordance with embodiments of the invention.
Figure 5B:
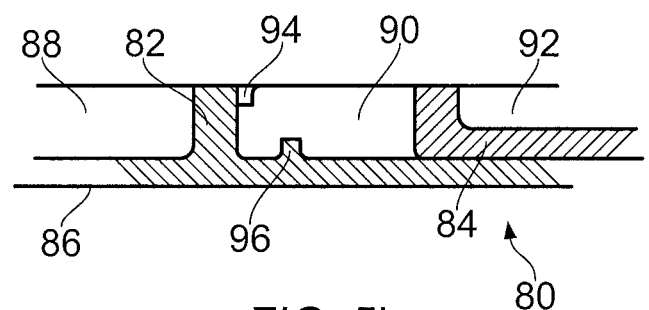

Referring now to FIGS. 5a and 5b an exemplary pitch change mechanism forming part of the gas turbine engine fan blade apparatus 30 is generally provided at 80. The pitch change mechanism 80 comprises first 82 and second 84 pistons provided in a cylinder 86. A variable pitch chamber 88 is defined by the cylinder 86 and the first piston 82, a reverse pitch chamber 90 is defined by the first piston 82, second piston 84 and cylinder 86 and a return chamber 92 is defined by the second piston 84 and cylinder 86. Each of the chambers 88, 90, 92 has a fluid inlet and a fluid outlet allowing control of the pressure within each chamber 88, 90, 92 under the influence of an engine electron controller (EEC) (not shown). A first buffer 94 provided on the cylinder 86 limits travel of the first piston 82 so as to limit the maximum size of the variable pitch chamber 88. A second buffer 96 provided on the first piston 82 limits the travel of the second piston 84 so as to limit the minimum size of the reverse pitch chamber 90. A third buffer (not shown) provided on the cylinder limits travel of the first piston 82 so as to limit the minimum size of the variable pitch chamber 88. A fourth buffer (not shown) is provided on the cylinder to limit the minimum size of the return chamber 92.

The first piston 82 serves as an actuator for axial translation of a first ring (not shown), the first ring being further capable of rotation. Each of the spindles 52 is connected to the first ring via a lever. Axial translation of the first ring forced by the first piston 82 produces a rotary motion of the spindles 52. Such actuation further produces rotation of the first ring as a consequence of the resultant circumferential movement brought about by a rotary movement of the levers. The second piston 84 serves as an actuator for axial translation of a second ring (not shown), the second ring being further capable of rotation. Each of the spars 50 is connected to the second ring via a lever. Axial translation of the second ring forced by the second piston 84 produces a rotary motion of the spars 50. Such actuation further produces rotation of the second ring as a consequence of the resultant circumferential movement brought about by a rotary movement of the levers.

Referring to FIG. 5a the pistons 82, 84 are shown in a static state with the pressure controlled by the EEC such that it is at least as great in the variable pitch chamber 88 as in the return chamber 92 and no greater in the reverse pitch chamber 90 than in the return chamber 92. The first piston 82 is abutting the first buffer 94, and the second piston 84 is abutting the second buffer 96. In this way the pitch of the whole of each aerofoil part 36 is held constant in a finest forward pitch configuration. Abutment of the first piston 82 with the first buffer 94 corresponds to the finest pitch configuration permitted for the radially inner portion 38. Further abutment of the second piston 84 with the second buffer 96 corresponds to the radially outer portion 40 being aligned with the radially inner portion 38 (i.e. having the same pitch). As will be appreciated coarser configurations for the aerofoil part 36 may be achieved by first increasing the pressure in the return chamber 92 beyond that in the variable pitch chamber 88 and then equalising the pressure in these chambers 88, 92 where the pitch is at the desired pitch. If the first piston 82 abuts the third buffer then the coarsest pitch configuration permitted for the aerofoil part 36 is achieved. To maintain this condition the pressure in the return chamber 92 need only be at least as great as the pressure in the variable pitch chamber 88 and the pressure in the reverse pitch chamber 90 no greater than that in the return chamber 92. As will be appreciated finer pitch configurations are obtainable by reversing this process.

Referring now to FIG. 5b the pistons are again shown in a static configuration with the pressure controlled by the EEC such that it is at least as great in the reverse pitch chamber 90 as in the return chamber 92 and at least as great in the variable pitch chamber 88 as in the reverse pitch chamber 90. The first piston 82 is abutting the first buffer 94 and the second piston 84 is abutting the fourth buffer. In this way the radially outer portion 40 is in the greatest reverse pitch configuration permitted (corresponding to second piston 84 abutment with the fourth buffer) and the radially inner portion 38 is in the finest pitch configuration permitted (corresponding to the first piston 82 abutting the first buffer 94). As will be appreciated adjustment to the degree of radially outer portion 40 reverse pitch can be achieved by varying the pressure in the reverse pitch 90 and/or return 92 chambers. Variation of the pressure in one or both of these chambers can return the radially outer portion 40 to forward pitch ready for aligned configuration operation. The coarseness of the radially inner portion 38 forward pitch can be independently adjusted by varying the pressure in the variable pitch 88 and/or reverse pitch 90 chambers.

As will be appreciated the second buffer 96 acts in unison with the cooperating stop surfaces to ensure that the radially outer portion 40 is carried with the radially inner portion 38 when they are in the aligned configuration and the radially inner portion 38 is actuated from a coarser to a finer forward pitch configuration. Further whilst the radially outer portion 40 remains in a forward pitch configuration, on-rushing air will tend to bias it towards following finer to coarser pitch adjustments of the radially inner portion 38 (though this may be actively controlled via the pitch change mechanism). As will be further appreciated the first buffer 94 acts to limit the radially inner portion 38 to a range of forward pitch configurations, preventing (in contrast to the radially outer portion 40) a radially inner portion 38 reverse pitch configuration. Furthermore the radially outer portion 40 is rotatable throughout the same range of forward pitch configurations as the radially inner portion 38 because the third buffer prevents further coarsening of the radially inner portion 38 pitch before the second piston 84 abuts the first buffer 94.

The gas turbine engine fan blade apparatus 30 is installed in a gas turbine engine such as that shown in FIG. 1. The fan blade apparatus 30 may therefore for instance be driven directly or indirectly (e.g. via a gearbox) by a low pressure turbine. The radial position of the interfaces 42 of the blades 34 is selected such that they are substantially aligned with a core casing of the gas turbine engine. In this way the radially inner portions 38 are substantially aligned with an inlet to a bypass duct of the gas turbine engine and the radially outer portions 40 are substantially aligned with an inlet to a core duct of the gas turbine engine. The blades 34 themselves are installed such that they are axially spaced forward of the inlet to the core duct sufficient to create an adequate flow path for air travelling from an exhaust of the bypass duct to the bypass duct inlet and behind the fan into the core duct inlet and core for reverse thrust operation.

In use the aerofoil part 36 is operated with all the radially inner 38 and radially outer 40 portions in the aligned configuration during normal forward thrust operation of the engine. Whilst the portions 38, 40 remain in the aligned configuration the pitch of the whole of each aerofoil part 36 can be selectively varied among a range of forward pitch configurations via the pitch change mechanism 80 under the control of the ECC. ECC control of the aerofoil part 36 pitch may be automatic, semi-automatic or manually instigated. Exemplary parameters on which the ECC may base such control include control inputs for the gas turbine engine (either from a controller such as a pilot or from a FADEC) and/or its operating condition and/or ambient conditions. By varying the pitch of the aerofoil parts 36 in this way, the efficiency and/or stability of the gas turbine engine and/or one or more of its components systems may be improved.

Where reverse thrust is required (e.g. during aircraft landing or manoeuvring on the ground) the radially outer portions 40 are rotated to a reverse pitch configuration whilst the radially inner portions 38 remain in in a forward pitch configuration. In this way the radially outer portions 40 create reverse thrust by drawing air from the exhaust of the bypass duct, towards the bypass duct inlet and through the radially outer portions 40. Additional air is drawn from the exhaust of the bypass duct to the bypass duct inlet and is drawn into the core inlet and core. The forward pitch configuration of the radially inner portions 40 may reduce the impediment to this flow into the core. Further the forward pitch configuration of the radially inner portions 38 may tend to drive air into the core and some of this may be from across the fan, against the reverse thrust created by the radially outer portions 40.

It will be understood that the invention is not limited to the embodiments above-described and various modifications and improvements can be made without departing from the concepts described herein. By way of example, rotational control of all radially inner 38 and radially outer 40 portions is described as being made via a ganged mechanism including a first and second rings and a single cylinder and piston arrangement. Alternative pitch change mechanisms are possible whereby for instance each aerofoil part 36 is controlled by its own pitch change mechanism (i.e. one cylinder and piston arrangement per aerofoil part 36 controlling both its radially inner 38 and radially outer 40 portions). Another alternative is that each radially inner portion 38 is operated via its own independent pitch change mechanism (i.e. cylinder and piston arrangement) and each radially outer portion 40 is operated via its own independent pitch change mechanism (i.e. cylinder and piston arrangement). Yet another option would be to provide ganged operation for all radially inner portions 38 via a first pitch change mechanism (i.e. cylinder, piston and ring arrangement), and ganged operation for all radially outer portions 40 via a second pitch change mechanism (i.e. cylinder, piston and ring arrangement). Except where mutually exclusive, any of the features may be employed separately or in combination with any other features and the disclosure extends to and includes all combinations and sub-combinations of one or more features described herein.

The invention claimed is:

1. A gas turbine engine fan blade apparatus comprising:
   first and second variable pitch rotatable mountings;
   an aerofoil part, the airfoil part comprising a radially inner portion and a radially outer portion mounted by the first and second variable pitch rotatable mountings; and
   a pitch change mechanism connected to the radially inner portion and the radially outer portion, wherein the pitch change mechanism is arranged to provide:
      a first configuration in which the radially inner portion and the radially outer portion are aligned and have any pitch value within a range of forward pitch values, the radially inner portion and the radially outer portion in the first configuration being aligned from a leading edge to a trailing edge of the aerofoil part, and
      a second configuration in which the radially inner portion has a finest forward pitch value of the range of forward pitch values and the radially outer portion is rotated to a reverse pitch.

2. The gas turbine engine fan blade apparatus according to claim 1, wherein the radially inner portion and the radially outer portion comprise cooperating stop surfaces that abut when the radially inner portion and the radially outer portion are aligned and the stop surfaces prevent relative rotation of the radially inner portion and the radially outer portion beyond alignment in a rotational direction corresponding to returning the radially outer portion to alignment with the radially inner portion from a reverse pitch configuration of the radially outer portion.

3. The gas turbine engine fan apparatus according to claim 2, wherein the radially outer portion comprises an inner surface and the radially inner portion comprises an outer surface which opposes the inner surface when the radially inner and radially outer portions are aligned, and each of the inner and outer surfaces comprise at least one radially extending lip and at least one radial rebate alternating around a perimeter of the respective surface and wherein further, when the radially inner portion and the radially outer portion are aligned, the radially extending lips of both the inner and outer surfaces are opposed by radial rebates of the other surface and the radial rebates of both the inner and outer surfaces are opposed by radially extending lips of the other surface.

4. The gas turbine engine fan blade apparatus according to claim 1, wherein a spar connected to the radially outer portion extends radially inwards therefrom and through an internal passage in the radially inner portion.

5. The gas turbine engine fan blade apparatus according to claim 4, wherein a spindle connected to the radially inner portion extends radially inwards therefrom and the spar extends so that at least parts of the spar and spindle are concentric.

6. The gas turbine engine fan blade apparatus according to claim 5, wherein the first variable pitch rotatable mounting is located between the spar and the spindle in an area where the spar and the spindle are concentric.

7. A gas turbine engine comprising the gas turbine engine fan blade apparatus according to claim 1.

8. The gas turbine engine according to claim 7 comprising a bypass duct and a core duct separated by a core casing and wherein the radial position between the radially inner portion and the radially outer portion is substantially aligned with the radial position of a leading edge of the core duct.

9. The gas turbine engine according to claim 7, wherein the fan blade is axially spaced from the core casing such that a flow path is created behind the fan for the flow of air from the bypass duct to the core duct sufficient for thrust reverse operation.

10. A method of operating the gas turbine engine according to claim 7, the method comprising selectively rotating the radially outer portion with respect to the radially inner portion such that the radially outer portion has a reverse pitch configuration.

* * * * *